United States Patent
Brant et al.

[11] Patent Number: 5,848,435
[45] Date of Patent: Dec. 8, 1998

[54] ADDRESS PROTECTION CIRCUIT AND METHOD FOR PREVENTING ACCESS TO UNAUTHORIZED ADDRESS RANGERS

[75] Inventors: William Alexander Brant; Edde Tin-Shek Tang, both of Boulder, Colo.

[73] Assignee: EMC Corporation, Hopkinton, Mass.

[21] Appl. No.: 551,928

[22] Filed: Oct. 23, 1995

Related U.S. Application Data

[63] Continuation of Ser. No. 600,512, Oct. 19, 1990, abandoned.

[51] Int. Cl.⁶ .................................................. G06F 12/14
[52] U.S. Cl. .......................... 711/152; 711/163; 711/164
[58] Field of Search ................................... 711/152, 163, 711/164

[56] References Cited

U.S. PATENT DOCUMENTS

| | | | |
|---|---|---|---|
| 3,806,882 | 4/1974 | Clarke | 395/425 |
| 3,893,178 | 7/1975 | Sordello | 360/73.02 |
| 4,092,732 | 5/1978 | Ouchi | 395/575 |
| 4,467,421 | 8/1984 | White | 395/425 |
| 4,562,576 | 12/1985 | Ratcliffe | 371/11.1 |
| 4,667,326 | 5/1987 | Young et al. | 371/39.1 |
| 4,722,085 | 1/1988 | Flora et al. | 371/40.1 |
| 4,754,397 | 6/1988 | Varaiya et al. | 361/380 |
| 4,761,785 | 8/1988 | Clark et al. | 371/2.2 |
| 4,768,193 | 8/1988 | Takemae | 371/10.3 |
| 4,775,978 | 10/1988 | Hartness | 371/40.1 |
| 4,814,982 | 3/1989 | Weir | 395/275 |
| 4,817,035 | 3/1989 | Timsit | 395/425 |
| 4,849,929 | 7/1989 | Timsit | 395/575 |
| 4,870,643 | 9/1989 | Bultman et al. | 371/11.1 |
| 4,899,342 | 2/1990 | Potter et al. | 371/10.1 |
| 4,914,656 | 4/1990 | Dunphy, Jr. et al. | 371/10.2 |
| 4,949,238 | 8/1990 | Kamiya | 395/425 |
| 4,956,769 | 9/1990 | Smith | 395/600 |
| 4,959,860 | 9/1990 | Watters et al. | 380/4 |
| 4,993,030 | 2/1991 | Krakauer et al. | 371/40.1 |
| 5,023,773 | 6/1991 | Baum et al. | 395/425 |
| 5,027,317 | 6/1991 | Pepera et al. | 395/375 |
| 5,043,878 | 8/1991 | Ooi | 395/375 |
| 5,065,429 | 11/1991 | Lang | 380/4 |
| 5,081,675 | 1/1992 | Kittirutsunetorn | 380/4 |
| 5,113,442 | 5/1992 | Moir | 380/4 |

FOREIGN PATENT DOCUMENTS

| | | |
|---|---|---|
| 0152024 | 8/1985 | European Pat. Off. . |
| 1601956 | 11/1981 | United Kingdom . |

OTHER PUBLICATIONS

Carroll, "Implementing Multilevel Security By Violation Privilege," Computers and Security 7(1988) Dec., No. 6, Oxford, Gr. Britain, pp. 563–573.

IBM Technical Disclosure Bulletin; vol. 22 No. 5, Oct. 1979, pp. 2009–2010, Sutton et al, "Processors Sharing and Partitioning of Main Storage in the Multiprocessor System".

Maximum Strategy, Inc., San Jose, CA; Strategy 2 Disk Array Controller Operation Manual (Nov. 2, 1988).

*Primary Examiner*—Glenn Gossage
*Attorney, Agent, or Firm*—William J. Kubida, Esq.; Carol W. Burton, Esq.; Holland & Hart LLP

[57] ABSTRACT

An address protection circuit (APC) for cross-checking the integrity of requests to read or write an addressable system memory in a fault-tolerant computer system. In a check mode, the APC checks each address and a source identification code of each memory access request from an address source. The source identification code and current bus address are compared to a range of addresses stored in the APC. If the current bus address is within an "authorized" range, access to that range of locations in the memory is allowed to the address source. If a current memory access request is not authorized, the APC asserts an error signal which may be used to transfer control to a redundant subsystem. The APC contains a content-addressable memory element that can be initialized by a subsystem processor with address ranges and type of access (e.g., read or write) allowed for each source. To enter the setup mode, the APC must first be addressed to switch the APC from its check mode. Thereafter, only a single value in the APC can be changed by the processor. The APC then automatically reverts to its check mode. Further changes to values in the APC each require an explicit switch from the check mode to the setup mode.

106 Claims, 3 Drawing Sheets

```
        CAM 21
        CONTENTS
                              CAMIN ADDRESS

⋮        ⋮       RW    SID    A23   •••    A11
   ┌─────────┐
   │    0    │        0   0111    00000000111
   ├─────────┤
   │    1    │        1   0111    00000000111
   ├─────────┤
   │    1    │        0   1000    00000000111
   ├─────────┤
   │    1    │        1   1000    00000000111
   └─────────┘
    ⋮        ⋮
```

FIG. 3

ADDRESS PROTECTION CIRCUIT AND METHOD FOR PREVENTING ACCESS TO UNAUTHORIZED ADDRESS RANGERS

This is a continuation of application Ser. No. 07/600,512, filed Oct. 19, 1990, now abandoned.

BACKGROUND OF THE INVENTION

1. Field of the Invention

This invention relates to a fault-prevention circuit for a computer system, and more particularly to a circuit for cross-checking the integrity of Read/Write requests to an addressable system memory in a fault-tolerant computer system.

2. Related Art

Fault-tolerant computer systems are designed to provide "non-stop" computing despite the failure of a component, such as a circuit, power supply, or peripheral device. Such computers are often used for "mission critical" applications where an interruption in computing is highly detrimental.

A principal characteristic of a truly fault-tolerant computer system is the lack of any single point of failure. That is, no failure of any single component will cause a failure of the entire system. Such fault tolerance is achieved principally by providing redundancy of function. A second important characteristic of a truly fault-tolerant computer system is the lack of any loss of data in the event of a component or subsystem failure. While "non-stop" computing is important, "error free" computing is even more so.

Redundancy can be achieved in several ways. In some instances, redundant subsystems can be operated in parallel, so that failure of one subsystem does not affect the continuing operation of the counterpart redundant subsystem. Some of such subsystems (for example, power supplies) are generally "fail safe", meaning that continued operation and data integrity are not dependent on detecting a fault condition in a failed component; when a component fails, the redundant component simply continues to provide the necessary functionality. However, with other subsystems, such as central processing units, a means must first be provided for detecting a fault. Once a fault is detected, a means must be provided for either correcting the resulting fault condition, or replacing the functionality of the failed component (e.g., with a redundant subsystem).

The principal of using redundancy to provide fault tolerance can be extended to the components of each subsystem. However, duplicating each and every component of a subsystem is expensive and adds complexity to the subsystem design. Therefore, other techniques have been developed to provide fault tolerance on a system or subsystem level without the added cost and complexity of duplicating all components. For example, solid state memory subsystems can be made fault-tolerant by adding error detection and correction circuitry implementing the well-known Hamming code. In a 32-bit wide data system, by adding only 7 additional bits to each 32-bit word permits detection of at least 2 bits in error, and correction of 1 bit in error. Thus, fault-tolerance can be achieved not by redundancy of components, but by providing redundancy of information by means of independent circuitry designed to monitor a component for failure. The independent circuitry can then either correct the error or provide some other means to accommodate the error (e.g., by providing a signal to transfer functional control to another subsystem).

The subsystems in many computer systems, such as a disk controller, contain their own microprocessor systems, typically having read-only memory (ROM), random-access memory (RAM), input/output (I/O) circuitry, and a microprocessor circuit. Fault-tolerance for the system as a whole can be achieved by providing redundant subsystems. However, provision must be made to prevent a faulty subsystem from corrupting data before a fault is detected within the subsystem. Therefore, the subsystem should be internally fault-tolerant at least to the point of not corrupting data.

Providing such internal fault-tolerance for a microprocessor subsystem presents the same issues discussed above. The components may be made redundant and operated in "lock step", so that if any one component fails, the difference between the operational states of the redundant component indicates a fault. Control may then be transferred to a redundant subsystem.

The most expensive single component of such a subsystem is the microprocessor circuit itself. A major drawback of lock-stepped microprocessors is the cost of providing a second processor and the added circuitry required to detect a difference in output of the two processors.

Therefore, it is desirable to provide some means of providing fault-detection in such a system without the added expense and complexity of redundant microprocessor circuits. The present invention provides such a means.

SUMMARY OF THE INVENTION

The present invention comprises an Address Protection Circuit (APC) which cross-checks the integrity of requests to read or write an addressable system memory to provide fault-detection and avoid a single point of failure in a fault-tolerant computer system.

The APC provides a means for achieving subsystem-level fault-tolerance, and prevents internal subsystem data loss, based upon recognition that a fault in a processor is likely to cause a subsystem error only when the fault causes the processor to alter the contents of an addressable subsystem memory (such as RAM, registers, FIFO's, etc.). This concept can be generalized for subsystems in which a variety of sources can alter the contents of system memory (e.g., Direct Memory Access, or DMA, circuits).

In the preferred embodiment, the APC has two modes of operation. In the check mode, the APC is coupled to the system bus and checks each address and the source identification (SID) code of each memory access request from an address source (e.g., processor or DMA circuit). Optionally, the APC also checks the system bus Read/Write (R/W) line. The SID code and current bus address are compared to a range of addresses stored in a table in the APC. If the current bus address is within an "authorized" range, access to that range of locations in the memory is allowed to the address source. If the R/W status is also being checked, the requested access is allowed only if the current address source is addressing an authorized range of memory locations and the type of access (Read or Write) requested is authorized.

If a current memory access request is not authorized, the APC asserts an error signal. In a fault-tolerant system, the assertion of an APC error signal may be used to transfer control to a redundant subsystem.

The second mode of APC operation is a setup mode. The APC contains a content-addressable memory element that can be initialized by the subsystem processor with address ranges and type of access allowed for each address source. In the preferred embodiment, the APC must first be specifically addressed to switch the APC from its check mode to its setup mode as a safeguard against inadvertent changes to the APC authorization table. Thereafter, a single value in the APC table can be changed by the processor (whose SID code is checked before such a change is allowed). The APC then automatically reverts to its check mode. Further changes to the APC table each require an explicit switch from the check mode to the setup mode.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

FIG. 3 is a diagram showing several exemplary memory locations of the content addressable memory of the preferred embodiment of the invention.

Like reference numbers and designations in the drawings refer to like elements.

DETAILED DESCRIPTION OF THE INVENTION

Throughout this description, the preferred embodiment and examples shown should be considered as examples, rather than limitations on the present invention.

OVERVIEW

Figure 1:
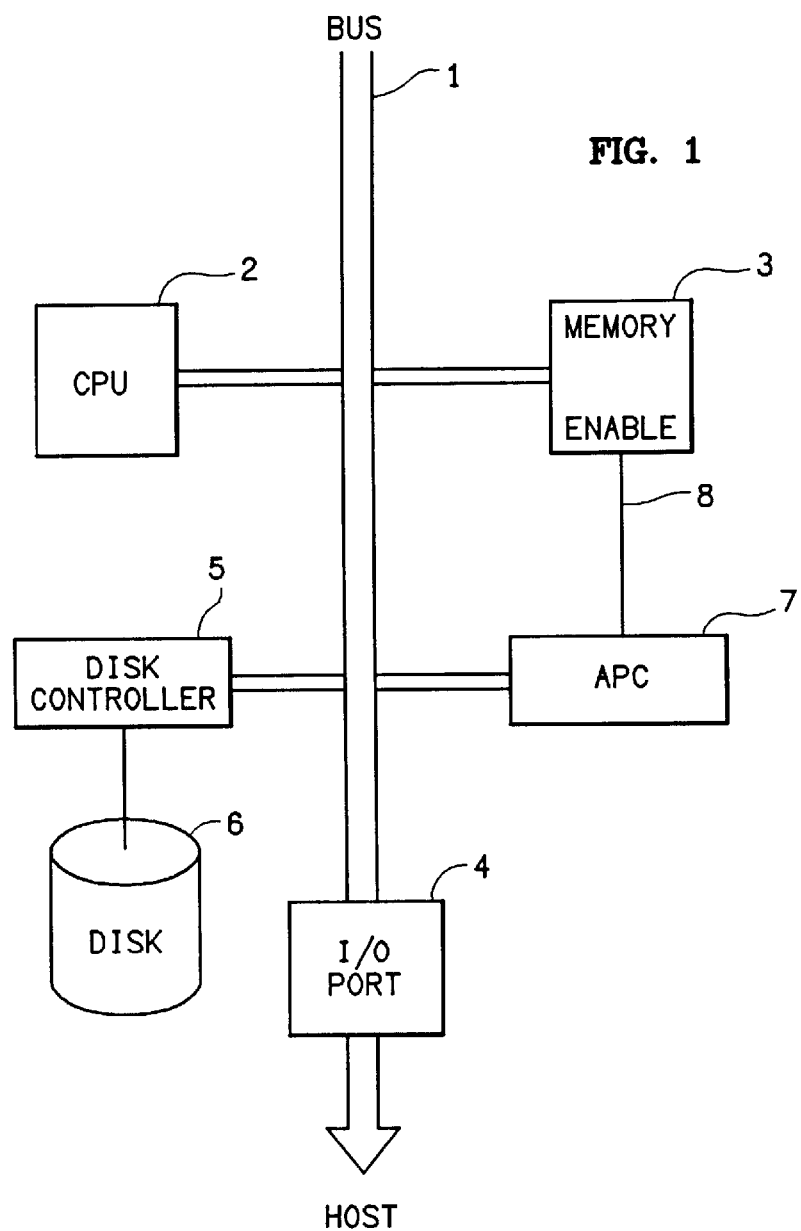
FIG. 1 is a block diagram of a microprocessor system incorporating the present invention.

FIG. 1 shows a block diagram of a microprocessor system incorporating the present invention. A system bus 1 forms the principal communication pathway in the system, and includes data, address, and control lines. In the illustrated embodiment, addresses are 32 bits wide, corresponding to 32 address lines. The control lines include at least a Read/Write (RW) status line, an Address Strobe (AS) line, and address Source Identification (SID) lines. The system includes at least a microprocessor 2 and system memory 3 (e.g., RAM) coupled to the system bus 1, and other components as required by a particular application. Shown in the illustrated embodiment is an I/O port 4 and a disk controller 5, with attached disk 6, coupled to the system bus 1.

Also shown in FIG. 1 is the inventive Address Protection Circuit (APC) 7, which is connected to the address lines of the system bus 1 and to an ENABLE input to the memory 3 via signal line 8. If the APC 7 asserts a NO-ACCESS signal on the ENABLE input via signal line 8, the memory 3 cannot accept READ or WRITE commands, or respond to an address asserted on the system bus 1 by an address source. In addition, assertion of the NO-ACCESS signal during normal operation can be used to transfer control to a redundant subsystem.

In the illustrated embodiment, the microprocessor 2, the disk controller 5, or the I/O port 4 can be an address source. Each address source is capable of asserting at least a READ or a WRITE command and an address on the system bus 1 directed to the memory 3. If access to the memory 3 is allowed by the APC 7, data can be written to or read from the memory 3 by the address source, in known fashion.

Each address source is pre-assigned a Source Identification (SID) code, which establishes a unique identity for each address source. The SID code can also be used as an access priority code to determine which address source has preferential access to the system bus 1. The SID code of each address source is asserted over the SID lines of the system bus 1. In the illustrated embodiment, the SID code is 4 bits wide, corresponding to 4 lines SID0–SID3.

In the preferred embodiment, the APC 7 has two modes of operation. In the check mode, the APC 7 is coupled to the system bus and checks each address and the SID code of each memory access request from an address source. Optionally, the APC 7 also checks the system bus RW line. The SID code and current bus address are compared to a range of addresses stored in a content-addressable memory table in the APC 7. If the current bus address is within an "authorized" range, access to that range of locations in the memory is allowed to the address source. If the RW status is also being checked, the requested access is allowed only if the current address source is addressing an authorized range of memory locations and the type of access (Read or Write) requested is authorized. If a current memory access request is not authorized, the APC 7 asserts an error signal.

The second mode of APC 7 operation is a setup mode. The content-addressable memory table in the APC 7 can be initialized by the subsystem processor with address ranges and type of access allowed for each address source. In the preferred embodiment, the APC 7 must first be specifically addressed to switch the APC 7 from its check mode to its setup mode as a safeguard against inadvertent changes to the APC 7 authorization table. Thereafter, a single value in the APC 7 table can be changed by the processor (whose SID code is checked before such a change is allowed). The APC 7 then automatically reverts to its check mode. Further changes to the APC 7 table each require an explicit switch from the check mode to the setup mode.

DETAILS OF CIRCUITRY

Figure 2:
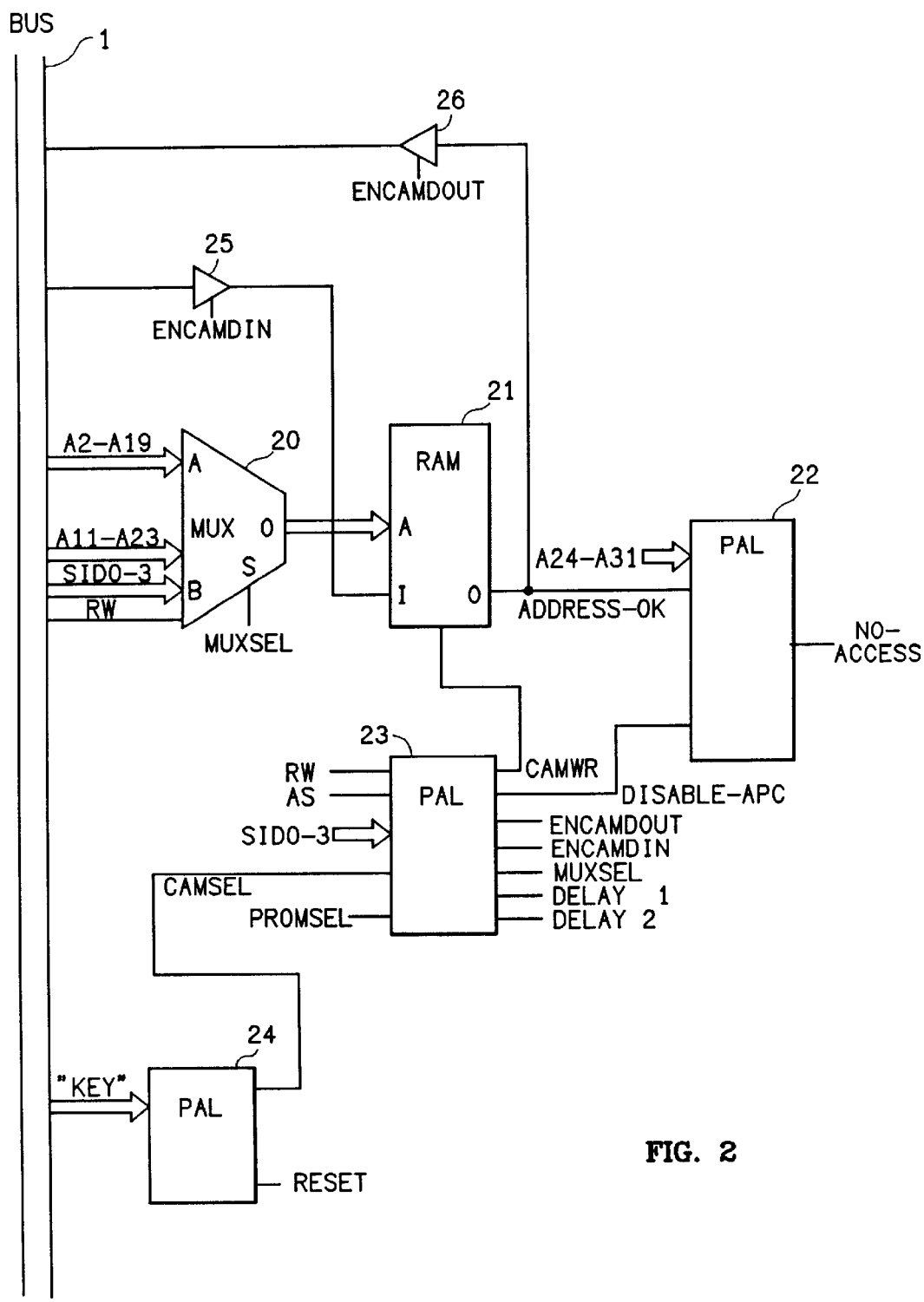
FIG. 2 is a block diagram of the preferred embodiment of the address protection circuit of the present invention.

FIG. 2 shows a block diagram of the preferred embodiment of the present invention. A multiplexer (MUX) 20 is coupled to two sets of inputs. In the preferred embodiment, the A-input of the MUX 20 is coupled to address lines A2–A19 of the system bus 1. The B-input of the MUX 20 is coupled to address lines A11–A23 of the system bus 1, the SID lines SID0–SID3, and the RW line. A MUXSEL signal coupled to the select input S of the MUX 20 selects either the A-input or the B-input of the MUX 20 for output as an 18-bit wide CAMIN address signal.

The CAMIN output of the MUX 20 is coupled to the address inputs of a Content Addressable Ram (CAM) 21. In the illustrated embodiment, the CAM 21 comprises a 256Kx1 RAM circuit (other RAM sizes may be used with other system memory 3 sizes). The output of the CAM 21 is an ACCESS-OK signal coupled to an output Programmable Array Logic (PAL) 22. Normally, the ACCESS-OK signal is inverted and passed through the output PAL 22 as the NO-ACCESS signal. As noted previously, the NO-ACCESS signal is coupled to the ENABLE input of the memory 3 via signal line 8.

In the illustrated embodiment, the first 11 bits (A0–A10) of the address on the system bus 11 are ignored by the APC 7 during the check mode. This has the effect of treating the memory 3 as comprising "pages" of addressable locations, each page being 2048 bytes (2¹¹) in size. For example, an address in the range from 0 to 2047 from a single address source is treated as a single address by the CAM 21. Thus, only one memory location in the CAM 21, storing a single bit, is required to determine whether an address source is authorized to access each 2048-byte page in the memory 3. With a page size of 2048 bytes and 13 address lines applied to the B-input of the MUX 20, up to 16 MB of system memory 3 can be controlled by the APC 7. By using a larger capacity RAM circuit for the CAM 21, and/or a larger page size, a larger system memory 3 can be controlled by the APC 7. Alternatively, by using a larger capacity RAM circuit for the CAM 21, a smaller page size may be used, down to a "range" of a single byte per page.

As an added protective measure, address lines A24–A31 are input to the output PAL 22. In the illustrated embodiment, only 16 MB of memory are used, requiring only 24 bits for addressing. However, the system bus 1 has 32 address lines, so the high-order 8 lines are normally unused. The PAL 22 asserts the NO-ACCESS signal if any of the address lines A24–A31 are asserted during a memory access operation. This prevents erroneous access to the memory 3, and can be used to transfer control to a redundant subsystem.

For testing and initializing purposes, it is desirable to disable the system memory 3 entirely. A third input to the output PAL 22 is a DISABLE-APC signal generated from an input PAL 23. Assertion of the DISABLE-APC signal causes the output PAL 22 to assert the NO-ACCESS signal.

$$\text{NO-ACCESS} = \overline{\text{ACCESS-OK} \cdot \overline{\text{DISABLE-APC}} + \overline{(A24-A31)}}$$

Thus, in the preferred embodiment, the NO-ACCESS signal is generated under the following conditions ( $\overline{A24-A31}$ should be understood to mean the inverse of the logical AND of the unasserted state of each of the address lines A24 through A31 of the inverse of $\overline{A24}.\overline{A25} \ldots \overline{A31}$):

An input PAL 23 generates a variety of signals within the APC 7 based upon the SID lines SID0–SID3, the RW line, the Address Strobe signal from the system bus 1 (generated by an address source when an address asserted by the address source is stable, in known fashion), a PROMSEL signal, and a CAMSEL signal. The PROMSEL signal is generated external to the APC 7, and can be used to disable the memory 3 when a memory device (e.g., a Programmable Read-Only Memory, or PROM) other than the system memory 3 is to be addressed. An address decoder PAL 24 accepts a single address from the microprocessor 2 (or any other processor) as a "key" address and generates the CAMSEL signal, the principal function of which is to put the APC 7 into the setup mode. The CAMSEL signal is combined with other input signals to the input PAL 23 to disable the output of the APC 7, select the A-input of the MUX 20 for input into the CAM 21, enable a tristate input buffer 25 coupled to the data input of the CAM 21 and to a data line (D0) of the system bus 1, and generate a CAMWR signal to the CAM 21 to clock data into the CAM 21. In particular, the following signals are generated by the input PAL 23 based on its input signals:

| | | |
|---|---|---|
| MUXSEL | = | CAMSEL |
| DELAY1 | = | CAMSEL · AS · WR |
| DELAY2 | = | DELAY1 |
| CAMWR | = | CAMSEL · WR · AS · DELAY2 · (SID0 · SID1 · SID2 + $\overline{\text{SID3}}$) |
| ENCAMDIN | = | CAMSEL · AS · WR · DELAY1 |
| DISABLE-APC | = | (CAMSEL + PROMSEL) · (SID0 · SID1 · SID2 + $\overline{\text{SID3}}$) |

The "=" sign in the above equations indicates one delay time through the PAL circuit. The DELAY1 and DELAY2 signals are internal feedback signals of the input PAL 23. For the CAMWR and DISABLE-APC signals, the address source must be the microprocessor 2, which has a SID code of "1110" in the illustrated embodiment.)

SETUP MODE

As noted above, the contents of the memory locations of the CAM 21 are initialized during the setup mode. Each "address" (i.e., memory location) of the CAM 21 is set for one of two authorization codes: binary 0 if the current address source is not authorized for the current address range, and binary 1 if the current address source is authorized for the current address range. If the RW status is also being checked, the authorization code also depends on whether the type of access (Read or Write) requested by the address source is authorized. The CAM 21 is initialized by the microprocessor 2 (or any other processor) with address ranges and type of access allowed for each address source.

In the preferred embodiment, the APC 7 must first be addressed by a "key" address value to switch the APC 7 from its check (or "locked") mode to its setup (or "unlocked") mode. This is accomplished by the address decoder PAL 24. The address decoder PAL 24 detects a single "key" address on the address bus 1, and sets itself to hold the CAMSEL signal for one cycle of the system bus 1.

Thereafter, the address decoder PAL 24 resets itself via an internal RESET signal. The CAMSEL signal causes the next address on the address bus 1 to be applied to the CAM 21 through the A-input of the MUX 20. In addition, a data value is applied to the data input of the CAM 21 through the tristate buffer 25, and stored in the CAM 21 upon the application of the CAMWR signal from the input PAL 23.

By this sequence, each storage location in the CAM 21 can be programmed to a binary 0 or binary 1 value. However, because the CAMSEL signal is reset after initializing a CAM 21 location, the microprocessor 2 must re-supply the "key" address for each storage location to be initialized. In addition, the CAMWR signal can only be generated if the microprocessor 2 is the current address source, since the input PAL 23 checks that the SID code of the microprocessor 2 is present before generating the CAMWR signal. This security system helps insure that the APC 7 cannot be changed inadvertently, thus preserving its fault-tolerant function.

CHECK MODE

In the check mode, the B-input is selected by the MUXSEL signal for output to the CAM 21. In effect, the address and SID code of each memory access request from an address source (e.g., microprocessor 2 or I/O port 4), and the state of the RW line, are concatenated and applied to the CAM 21 as the CAMIN address signal.

As noted above, the content of the memory location in the CAM 21 corresponding to the CAMIN address signal is an authorization code, which is output from the CAM 21 as the ACCESS-OK signal. The authorization code is a binary 0 if the current address source is not authorized for the input address range, and a binary 1 if the current address source is authorized for the input address range. If the RW status is also being checked, as in the preferred embodiment, the requested access is allowed only if the current address source is addressing an authorized range of memory locations and the type of access (Read or Write) requested is authorized for the address source. (In some embodiments, all address sources may have both Read and Write authorization. In such a case, the RW line need not monitored.)

If the current address source is authorized to Read or Write the range of addresses in the current access request, the ACCESS-OK signal is asserted by the CAM 21. Unless blocked by the DISABLE-APC signal applied to the output PAL 22, the NO-ACCESS signal reflects the state of the ACCESS-OK signal, thus allowing the address source to access that range of locations in the memory 3.

FIG. 3 illustrates four storage locations of the CAM 21 after initialization during the setup mode (note that the storage location addresses shown in FIG. 3 would not be adjacent in an actual RAM circuit). CAMIN addresses 31 and 32 both represent an address range 0000000000111XXXXXXXXXXX on address lines generated by address A23–A0 source 0111 (where each "x" indicates a "don't care" value, since the lower 11 bits of each address are not applies to the CAM 21 in the check mode). In this example, a Write operation is indicated by a binary 1 on the RW status line. The contents (0) of the CAM 21 for address 31 indicates that address source 0111 is not authorized to Read locations in the system memory 3 in the specified range. The contents (1) of the CAM 21 for address 32 indicate that address source 0111 is authorized to Write locations in the system memory 3 in the same specified range.

CAMIN addresses 33 and 34 represent an address range 0000000000111XXXXXXXXXXX generated by address source 1000. The contents (1) of the CAM 21 for address 33 and address 34 indicate that address source 1000 is authorized to both Read and Write locations in the system memory 3 in the specified range.

In the illustrated embodiment, additional circuitry is provided for testing purposes. As noted previously, the tristate input buffer 25 is coupled to the input of the CAM 21 and to a data line (D0) of the system bus 1. The tristate input buffer 25 is controlled by the ENCAMDIN signal generated by the input PAL 23. A tristate output buffer 26 is coupled to the output of the CAM 21 and to the data line (D0) of the system bus 1. The tristate output buffer 26 is controlled by an ENCAMDOUT signal generated by the input PAL 23:

$$ENCAMDOUT = CAMSEL \cdot \overline{WR}$$

Normally, both the input buffer 25 and the output buffer 26 are disabled (i.e., placed in the high-impedance state). In the setup mode of the APC 7, or in a test mode, ENCAMDIN is asserted by the input PAL 23, allowing data to be loaded into the CAM 21 through the input buffer 25. In the test mode, if ENCAMDOUT is asserted, the output of the CAM 21 can be directly fed back to the system bus 1 through the output buffer 26. This arrangement permits data patterns to be loaded into the CAM 21 and directly read out for comparison by the microprocessor 2. Any discrepancies indicate a likely fault in the APC 7 or the system bus 1.

A number of embodiments of the present invention have been described. Nevertheless, it will be understood that various modifications may be made without departing from the spirit and scope of the invention. For example, the CAM 21 may be programmed over a separate bus from the system bus 1. In appropriate applications, the CAM 21 may be a pre-programmed ROM or PROM, and thus much of the other circuitry shown in FIG. 2 would be unnecessary. Further, while a content-addressable memory is the preferred means of storing the authorization table of the APC 7, other "look-up" table circuit structures may be used, or alternatively, algorithmic means (e.g., hashing algorithms) may be used, to check address source addresses for authorization. Accordingly, it is to be understood that the invention is not to be limited by the specific illustrated embodiment, but only by the scope of the appended claims.

We claim:

1. An address protection circuit for detecting erroneous memory address requests from at least one address source to a protected addressable memory in a system having a processor unit, the address protection circuit including:

(a) an address comparison means for comparing a memory address request from a requesting address source to a set of predefined authorization codes corresponding to address ranges in the addressable memory;

(b) a generating and transmitting means for generating and transmitting an access authorization signal to the addressable memory upon receipt of a memory address request from the requesting address source corresponding to at least one of the predefined authorization codes; and (c) a communication pathway coupled to the requesting address source and the protected addressable memory the communication pathway bypassing the processor unit and being adapted for communicating data between the requesting address source and the protected addressable memory in response to receipt of the access authorization signal by the addressable memory.

2. The address protection circuit of claim 1, further including disabling means, coupled to the address comparison means, for preventing the transmittal of the access authorization signal to the addressable memory.

3. The address protection circuit of claim 1, further including programming means, coupled to the address comparison means, for selectively programming each of the predefined authorization codes within the data storage means.

4. The address protection circuit of claim 3, wherein the programming means includes security checking means for limiting access to the programming means to preselected address sources.

5. The address protection circuit of claim 3, wherein the programming means is coupled to a first bus means and the address comparison means is coupled to a second bus means.

6. An address protection circuit for detecting erroneous memory address requests from at least one address source to a protected addressable memory in a system having a processor unit, the address protection circuit including:

(a) a data storage means for storing at least one authorization code for a corresponding address range in the addressable memory, (b) a generating and transmitting means for generating and transmitting an access authorization signal to the addressable memory upon receipt from a requesting address source of a memory address request corresponding to a stored authorization code; and (c) a communication pathway coupled to the requesting address source and the protected addressable memory the communication pathway bypassing the processor unit and being adapted for communicating data between the requesting address source and the protected addressable memory in response to receipt of the access authorization signal by the addressable memory.

7. The address protection circuit of claim 6, wherein the data storage means is content addressable.

8. The address protection circuit of claim 6, further including disabling means, coupled to the data storage means, for preventing the transmittal of the access authorization signal to the addressable memory.

9. The address protection circuit of claim 6, further including programming means, coupled to the data storage means, for selectively programming each stored authorization code within the data storage means.

10. The address protection circuit of claims 9 wherein the programming means includes means for limiting access to the programming means to a preselected address source.

11. The address protection circuit of claims 1, or 6, wherein each memory address request includes a set of memory address signals and a source identification code identifying a requesting address source.

12. The address protection circuit of claim 11, wherein each memory address request further includes a signal selectively identifying a read or write operation.

13. An address protection circuit for detecting erroneous memory address requests from at least one address source to a protected addressable memory in a system having a processor unit, the address protection circuit comprising:

(a) an address checking circuit, for generating and transmitting an access authorization signal to the protected addressable memory upon receipt of an authorized memory address request from a requesting address source and (b) a communication pathway coupled to the requesting address source and the protected addressable memory, the communication pathway bypassing the processor unit and being adapted for communicating data between the requesting address source and the protected addressable memory in response to receipt of the access authorization signal by the protected addressable memory.

14. An address protection circuit for detecting erroneous memory address requests from at least one address source to an addressable memory, the address protection circuit including:

(a) content addressable storage means,
  (1) for storing at least one authorization code for a corresponding address range in the addressable memory, and
  (2) for generating and transmitting an access authorization signal to the addressable memory upon receipt of a memory address request corresponding to a stored authorization code from a regulating address source to enable the requesting address source to directly access the protected addressable memory;

(b) programming means, coupled to the content addressable storage means, for selectively programming each authorization code within the content addressable storage means;

wherein each memory address request includes at set of memory address signals and a source identification code identifying a requesting address source.

15. The address protection circuit of claim 14, wherein the programming means includes security checking means for limiting access to the programming means to preselected coupled address sources.

16. An address protection circuit for detecting erroneous memory address requests from at least one address source to an addressable memory in a system having a processor unit, the address protection circuit including:

(a) a content addressable storage device for:
  (1) storing at least one authorization code for a corresponding address range in the addressable memory; and
  (2) generating and transmitting an access authorization signal to the addressable memory upon receipt of a memory address request corresponding to a stored authorization code from a requesting address source;
  wherein each memory address request includes a set of memory address signals and a source identification code identifying a requesting address source;
  wherein a communication pathway is coupled to the requesting address source and the addressable memory such that the communication pathway bypasses the processing unit, and wherein the communication pathway communicates data between the requesting address source and the addressable memory.

17. The address protection circuit of claim 16, wherein each memory address request further includes a signal selectively identifying a read or write operation.

18. The address protection circuit of claim 16, further including disabling means, coupled to the content addressable storage device, for preventing the transmittal of the access authorization signal to the addressable memory.

19. An address protection circuit for detecting erroneous memory address requests from at least one address source to a protected addressable memory, the address protection circuit including:

(a) content addressable random access memory means for:
  (1) storing at least one authorization code for a corresponding address range in the protected addressable memory; and
  (2) generating and transmitting an access authorization signal to the protected addressable memory upon receipt of a memory address request corresponding to one of the stored authorization codes from an address source to enable the requesting address source to directly access the protected addressable memory;

(b) multiplexing means, coupled to the content addressable random access memory means, for selecting between two sets of input signals and coupling the selected set of input signals to the content addressable random access memory means;

(c) first programmable array logic means, coupled to the content addressable random access memory means, for preventing access to the protected addressable memory when any one of the following conditions occur;
  (1) an address request is attempted at an address is outside a predetermined range of addresses;
  (2) a disable signal is asserted; or
  (3) the access authorization signal is not asserted, (d) second programmable array logic means, coupled to the first programmable array logic means, for generating and transmitting a content addressable random access memory write signal to the content addressable random access memory means, and the disable signal to the first programmable array logic means;

(e) third programmable array logic means, coupled to the second programmable array logic means, for generating and transmitting to the content addressable random access memory means, a content addressable random access memory select signal upon detection by the third programmable array logic means of a predetermined key.

20. An address protection circuit for detecting erroneous memory address requests from at least one address source to an addressable memory, the address protection circuit including:

(a) content addressable storage means:
  (1) for storing at least one authorization code for a corresponding address range in the addressable memory, and;
  (2) for generating and transmitting an access authorization signal to the addressable memory upon receipt of a memory address request corresponding to a stored authorization code from a requesting address source;

(b) means, coupled to the content addressable storage means, for transmitting the generated access authorization signal to the requesting address source upon receipt of a memory address request from the requesting address source;

wherein each memory address request from the address source includes a set of memory address signals and a source identification code identifying a requesting address source.

21. An address protection circuit for detecting erroneous memory address requests from at least one address source to a protected addressable memory, the address protection circuit including:

(a) content addressable storage means, coupled to at least one address source and to the protected addressable memory:

(1) for storing at least one authorization code for a corresponding address range in the protected addressable memory; and (2) for generating and transmitting an access authorization signal to the protected addressable memory upon receipt of d memory address request corresponding to a stored authorization code from a requesting address source to enable the requesting address source to directly access the protected addressable memory;

(b) programming means, coupled to the content addressable storage means for selectively programming each authorization code, and including a means for limiting access to the programming means to preselected address sources; and (c) disabling means, coupled to the content addressable storage means, for preventing the transmittal of the access authorization signal to the protected addressable memory;

wherein each memory address request includes a set of addressable memory address signals, a source identification code identifying the requesting address source, and a signal selectively identifying a read or write operation.

22. A method for detecting erroneous memory address requests from at least one address source to an addressable memory in a system having a processor unit, comprising the steps of:

(a) receiving memory address requests from a requesting address source;

(b) generating and transmitting an access approval signal to the addressable memory upon receipt of a valid memory address request from the requesting address source, (c) receiving the access approval by the addressable memory;

(d) communicating data between the requesting address source and the addressable memory; and (e) bypassing the processing unit when performing step (d).

23. A method for detecting erroneous memory address requests from at least one address source to an addressable memory in a system having a processor unit, comprising the steps of:

(a) receiving memory address requests from at least one address source;

(b) comparing each received memory address request to a set of predefined authorization codes corresponding to address ranges in the addressable memory a (c) generating and transmitting the access authorization signal to the addressable memory upon receipt of a memory address request corresponding to at least one of the predefined authorization codes, (d) receiving the access approval by the addressable memory;

(e) communicating data between the requesting address source and the addressable memory and (f) bypassing the processing unit when performing step (e).

24. The method for detecting erroneous memory address requests of claim 23, further including the step of selectively programming each of the predefined authorization codes.

25. The method for detecting erroneous memory address requests of claim 23, further including the step of selectively preventing the transmittal of the access authorization signal to the addressable memory upon receipt of a memory address request which does not correspond to at least one of the predefined authorization codes.

26. The method for detecting erroneous memory address requests of claim 24, further including the step of limiting the ability to change each of the predefined authorization codes to a preselected address source.

27. The method of claim 24, further including the step of subsequently changing one or more of the authorization codes.

28. An address protection circuit for detecting erroneous memory address requests from at least one address source to a protected addressable memory, the address protection circuit including:

(a) a content addressable random access memory for:

(1) storing at least one authorization code for a corresponding address range in the protected addressable memory; and (2) generating and transmitting an access authorization signal to the protected addressable memory upon receipt of a memory address request corresponding to a stored authorization code from a requesting address source to enable the requesting address source to directly access the protected addressable memory;

(b) a multiplexer, coupled to the content addressable random access memory, for selecting between two sets of input signals and coupling the selected set of input signals to the content addressable random access memory;

(c) first programmable array logic circuit, coupled to the content addressable random access memory circuit, for preventing access to the protected addressable memory when any one of the following conditions occur:

(1) an address request is attempted at an address outside a predetermined range of addresses;

(2) a disable signal is asserted; or (3) the access authorization signal is not asserted, (d) second programmable array logic circuit, coupled to the first programmable array logic circuit, for generating and transmitting a content addressable random access memory write signal to the content addressable random access memory, and the disable signal to the first programmable array logic circuit;

(e) third programmable array logic circuit, coupled to the second programmable array logic circuit, for generating and transmitting to the content addressable random access memory, a content addressable random access memory select signal upon detection by the third programmable array logic circuit of a predetermined key.

29. An address protection circuit for detecting erroneous memory address requests from at least one address source to a protected addressable memory, the address protection circuit including:
(a) a content addressable storage device for:
(1) storing at least one authorization code for a corresponding address range in the protected addressable memory; and
(2) generating and transmitting an access authorization signal to the protected, addressable memory upon receipt of a memory address request corresponding to a stored authorization code to enable the requesting address source to directly access the protected addressable memory;
(b) a programming circuit, coupled to the content addressable storage device, for selectively programming each authorization code, and including a security checking circuit for limiting access to the programming circuit to preselected address sources; and
(c) a disabling circuit, coupled to the content addressable storage device, for preventing the transmittal of the access authorization signal to the protected addressable memory;
wherein each memory address request from the address source includes a set of addressable memory address signals, a source identification code identifying a requesting address source, and a signal selectively identifying a read or write operation.

30. A circuit for detecting an erroneous memory address request from an address source to an addressable memory comprising:
an authorization code memory for storing an authorization code for an address range in the addressable memory to which said address source is permitted access;
a bus connected to apply an address and a source identification code from said address source to the authorization code memory, wherein said authorization code memory produces an affirmative authorization code only if the applied address is within the permitted address range of the address source;
and an access signal generator for providing an access signal to enable said address source to access said addressable memory in response to the affirmative authorization code.

31. The address protection circuit of claim 30 wherein said address source is an address source/other than a processor.

32. The address protection circuit of claim 30 wherein said address source is an I/O circuit.

33. The address protection circuit of claim 30 wherein said address source is a disk controller circuit.

34. The address protection circuit of claim 30 wherein said address source is a direct memory access circuit.

35. The address protection circuit of claim 30 wherein said address source is an address source of a redundant computer system.

36. The address protection circuit of claim 30 wherein said address source is an address source of a redundant computer subsystem.

37. The address protection circuit of claim 30 wherein said authorized address range of the address source is a page in the addressable memory.

38. The address protection circuit of claim 37 wherein said page in the addressable memory has a page size of approximately 2048 bytes.

39. The address protection circuit of claim 37 wherein said page in the addressable memory has a page size of 1 byte.

40. The address protection circuit of claim 30 wherein said authorization code memory is a CAM.

41. The address protection circuit of claim 30 wherein said authorization code memory is a "look-up" table.

42. The address protection circuit of claim 30 wherein said authorization code memory is implemented by an algorithmic means.

43. The address protection circuit of claim 42 wherein said algorithmic means includes a hashing algorithm.

44. The address protection circuit of claim 30 wherein said access signal generator is a PAL.

45. The address protection circuit of claim 30 wherein said access signal generator produces a no-access signal in the absence of said affirmative authorization code, said no-access signal disabling access by said address source to said addressable memory.

46. The address protection circuit of claim 30 further comprising a programming circuit coupled to the authorization code memory for selectively defining said authorization code within said second memory.

47. The address protection circuit of claim 46 further comprising a security circuit for limiting access by the programming circuit to a preselected address source.

48. The address protection circuit of claim 47 further comprising a security circuit including a PAL and wherein the preselected address source is a processor.

49. The address protection circuit of claim 30 further comprising a disable circuit coupled to the authorization code memory for disabling the addressable memory entirely.

50. The address protection circuit of claim 30 wherein said bus includes a read/write line and wherein a read/write signal from said address source is also applied to said authorization code memory to produce said authorization code.

51. The address protection circuit of claim 30 further comprising testing circuitry coupled to the authorization code memory and to an address source for conducting the access approval signal to the address source upon receipt by the authorization code memory of a memory address request.

52. The address protection circuit of claim 30 further comprising circuitry to provide a signal to transfer functional control to another subsystem if said memory does not produce an affirmative authorization code when an address that is not within the authorized address range of the address source is applied.

53. The address protection circuit of claim 30 wherein said access signal to enable said address source to access said addressable memory comprises a plurality of related access signals to a plurality of related addressable memory locations.

54. The address protection circuit of claim 30 wherein said address protection circuit is simulated by code running on a microprocessor.

55. A data processing system having an addressable memory, a processor address source, and at least another address source, each of said address sources providing an address to said addressable memory and a source identification code, and a bus for delivering at least said addresses to said addressable memory, comprising:
an address protection circuit coupled to receive said addresses and said source identification codes from said address sources;
said address protection circuit producing an affirmative authorization signal to the addressable memory upon receipt of an authorized memory address request from either said processor address source or said another address source.

56. The data processing system of claim 55 wherein said another address source is an I/O circuit.

57. The data processing system of claim 55 wherein said another address source is an direct memory access circuit.

58. The data processing system of claim 55 wherein said another address source is a disk controller circuit.

59. The data processing system of claim 55 wherein said another address source is an address source of a redundant computer system.

60. The data processing system of claim 55 wherein said address source is an address source of a redundant computer subsystem.

61. The data processing system of claim 55 wherein said authorized memory address request is an address request within an authorized address range.

62. The data processing system of claim 55 wherein said authorized address range is a page in the addressable memory.

63. The data processing system of claim 62 wherein said page in the addressable memory has a page size of approximately 2048 bytes.

64. The data processing system of claim 62 wherein said page in the addressable memory has a page size of 1 byte.

65. The data processing system of claim 55 wherein said address protection circuit comprises a CAM to produce said affirmative authorization signal upon receipt of an authorized memory address request.

66. The data processing system of claim 55 wherein said address protection circuit comprises a "look-up" table to produce said affirmative authorization signal upon receipt of an authorized memory address request.

67. The data processing system of claim 55 wherein said address protection circuit comprises an algorithmic means to produce said affirmative authorization signal upon receipt of an authorized memory address request.

68. The data processing system of claim 67 wherein said algorithmic means includes a hashing algorithm.

69. The data processing system of claim 55 wherein said address protection circuit further comprises a circuit to produce a no-access signal in the absence of an authorized memory address request.

70. The data processing system of claim 55 wherein said processor address source, and at least another address source provide a read/write signal to said addressable memory and wherein said read/write signals are also applied to said address protection circuit to produce said affirmative authorization signal.

71. The data processing system of claim 55 further comprising circuitry to provide a signal to transfer functional control to another subsystem if said address protection circuit does not produce an affirmative authorization signal upon receipt of an authorized memory address request.

72. The data processing system of claim 55 wherein said affirmative authorization signal to the addressable memory comprises a plurality of related affirmative authorization signals to a plurality of related addressable memory locations.

73. The data processing system of claim 55 wherein said address protection circuit is simulated by code running on a microprocessor.

74. An address protection circuit for detecting erroneous memory address requests from each of a plurality of address sources to an addressable memory, the address protection circuit including:

(a) a content addressable memory for storing an authorization code for each of said address sources, and for producing said authorization code when a memory access request is made to the content addressable memory by any one of said address sources, said memory access request including an address and an address source identification code that indicates whether said address is within a range of addresses authorized to said one of said address sources;

(b) and a circuit for providing an access authorization signal to the addressable memory according to said authorization code.

75. The address protection circuit of claim 74 wherein said plurality of address sources comprises at least one address source other than a processor.

76. The address protection circuit of claim 74 wherein at least one of said address sources is an I/O circuit.

77. The address protection circuit of claim 74 wherein at least one of said address sources is a disk controller circuit.

78. The address protection circuit of claim 74 wherein at least one of said address sources is a direct memory access circuit.

79. The address protection circuit of claim 74 wherein said at least one of said address sources is an address source of a redundant computer system.

80. The address protection circuit of claim 74 wherein said at least one of said address sources is an address source of a redundant computer subsystem.

81. The address protection circuit of claim 74 wherein said range of addresses authorized to a respective one said address sources is a page in the addressable memory.

82. The address protection circuit of claim 74 wherein each of said pages in the addressable memory has a page size of approximately 2048 bytes.

83. The address protection circuit of claim 81 wherein each of said pages in the addressable memory has a page size of 1 byte.

84. The address protection circuit of claim 81 further comprising setup mode circuitry coupled to the content addressable memory and to at least one of the address sources for selectively defining said authorization code.

85. The address protection circuit of claim 84 wherein the setup mode circuitry includes a security system for limiting access to the setup mode circuitry to a preselected one of the address sources.

86. The address protection circuit of claim 84 wherein said preselected one of the address sources is a processor.

87. The address protection circuit of claim 74 wherein each memory address request further includes a read/write signal.

88. The address protection circuit of claim 74 further including a disabling circuit coupled to the content addressable memory for preventing the transmittal of the access authorization signal to the addressable memory.

89. The address protection circuit of claim 74 further comprising a tester coupled to the content addressable memory and to at least one of the address sources for transmitting the access authorization signal to said at least one of the address sources when a memory address request is made by any one of the address sources.

90. The address protection circuit of claim 74 wherein said circuit for providing an access authorization signal comprises a plurality of related access authorization signals to a plurality of related addressable memory locations.

91. A method for detecting erroneous memory address requests from an address source to an addressable memory, comprising the steps of:

receiving memory address requests from the address source; and providing an access authorization signal to the addressable memory upon receipt of a valid memory address request from the address source.

92. The method of claim 91 wherein said access authorization signal to the addressable memory comprises a plurality of related access authorization signals to a plurality of related addressable memory locations.

93. A method for detecting erroneous memory address requests from an address source to an addressable memory in a redundant computer system, comprising the steps of:

receiving memory address requests from the address source;

providing a predefined authorization code corresponding to an authorized address range for said address source in the addressable memory; and providing an access authorization signal to the addressable memory selectively according to said authorization code upon receipt of a memory address request from said address source.

94. The method of claim 93 further comprising selectively programming said authorization code.

95. The method of claim 93 further comprising limiting the ability to change said authorization code to a preselected address source.

96. The method of claim 93 further comprising preventing the transmittal of an affirmative access authorization signal to the addressable memory upon receipt of a memory address request outside an authorized address range.

97. The method of claim 93 further comprising changing said authorization code.

98. The method of claim 93 wherein said access authorization signal comprises a plurality of related access authorization signals to a plurality of related addressable memory locations.

99. An address protection circuit for detecting erroneous memory access requests from at least one address source to a protected memory, comprising:

an address checking circuit connected to receive a memory access request from said at least one address source for providing a no-access signal to the protected addressable memory if said memory access request is not within an address range of said protected memory that is authorized to said at least one address source.

100. The address protection circuit of claim 99 wherein said at least one address source comprises a plurality of address sources.

101. The address protection circuit of claim 99 wherein said protected memory is a memory of a redundant computer system.

102. The address protection circuit of claim 101 wherein said no-access signal transfers control to a redundant subsystem.

103. The address protection circuit of claim 99 wherein said at least one address source is a processor.

104. The address protection circuit of claim 99 wherein said at least one address source is other than a processor.

105. The address protection circuit of claim 99 wherein said at least one address source is a direct memory access circuit.

106. The address protection circuit of claim 99 wherein said address protection circuit is simulated by code running on a microprocessor.

* * * * *